US011836592B2

(12) United States Patent
Andersen et al.

(10) Patent No.: US 11,836,592 B2
(45) Date of Patent: Dec. 5, 2023

(54) COMMUNICATION MODEL FOR COGNITIVE SYSTEMS

(71) Applicant: INTERNATIONAL BUSINESS MACHINES CORPORATION, Armonk, NY (US)

(72) Inventors: John J. Andersen, Austin, TX (US); Rob High, Round Rock, TX (US); Leah Lawrence, Austin, TX (US); Jennifer Sukis, Austin, TX (US); Wilson Wu, Arcadia, CA (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 15/843,302

(22) Filed: Dec. 15, 2017

(65) Prior Publication Data

US 2019/0188552 A1 Jun. 20, 2019

(51) Int. Cl.
*G06N 3/006* (2023.01)
*G06N 20/00* (2019.01)
(Continued)

(52) U.S. Cl.
CPC ............ *G06N 3/006* (2013.01); *G06N 20/00* (2019.01); *G10L 15/02* (2013.01);
(Continued)

(58) Field of Classification Search
CPC .... G06N 20/00; G06N 3/006; G06F 16/3322; G06F 3/048; G10L 15/02; G10L 15/1815;
(Continued)

(56) References Cited

U.S. PATENT DOCUMENTS 9,296,395 B2   3/2016  Forcke et al.
9,495,874 B1 * 11/2016  Zhu ...................... B60W 30/09
(Continued)

FOREIGN PATENT DOCUMENTS

AU   2012232977 A1    4/2013
CN   105204357 A     12/2015
(Continued)

OTHER PUBLICATIONS

Rucha Bapat; Helping Chatbots to Better Understand User Requests Efficiently using Human Computation; https://repository.tudelft.nl; Aug. 28, 2017; Tudelft.
(Continued)

*Primary Examiner* — Daniel Samwel
*Assistant Examiner* — David Tan
(74) *Attorney, Agent, or Firm* — Stosch Sabo; Cantor Colburn LLP

(57) ABSTRACT

Systems and methods for a cognitive system to interact with a user are provide. Aspects include receiving a cognitive system profile and observational data associated with the user. Environmental data associated with the user is received and features are extracted from the observations data and the environmental data. The features are stored in the user profile and analyzed to determine a situational context for each of the features based on the cognitive system profile and the user profile. Trigger events are identified based on the situational context for each of the features. One or more proposed actions are determined based at least in part on the one or more trigger events. At least one action is initiated from the one or more proposed actions and are stored in the user profile along with the one or more trigger events and the one or more features.

24 Claims, 7 Drawing Sheets

(51) Int. Cl.
*G10L 15/02* (2006.01)
*G10L 15/18* (2013.01)
*G10L 15/22* (2006.01)
*H04L 67/306* (2022.01)
*G10L 15/08* (2006.01)

(52) U.S. Cl.
CPC .......... *G10L 15/1815* (2013.01); *G10L 15/22* (2013.01); *H04L 67/306* (2013.01); *G10L 2015/088* (2013.01)

(58) Field of Classification Search
CPC . G10L 15/22; G10L 2015/088; H04L 67/306; H04L 67/10; H04L 67/12
See application file for complete search history.

(56) References Cited

U.S. PATENT DOCUMENTS

| | | | |
|---|---|---|---|
| 2013/0346347 A1* | 12/2013 | Patterson | G06N 20/00 706/12 |
| 2014/0067729 A1 | 3/2014 | Kozloski et al. | |
| 2014/0067730 A1* | 3/2014 | Kozloski | G16H 20/70 706/12 |
| 2014/0074454 A1* | 3/2014 | Brown | G06F 3/167 704/235 |
| 2014/0244429 A1* | 8/2014 | Clayton | G06Q 30/0631 705/26.7 |
| 2014/0324747 A1 | 10/2014 | Crowder et al. | |
| 2015/0120081 A1 | 4/2015 | Forcke et al. | |
| 2016/0086606 A1 | 3/2016 | Yeracaris et al. | |
| 2016/0093198 A1* | 3/2016 | Tung | G08B 21/0423 340/539.11 |
| 2016/0139575 A1* | 5/2016 | Funes | H04L 12/2823 700/275 |
| 2016/0293024 A1 | 10/2016 | Kozloski et al. | |
| 2017/0017694 A1 | 1/2017 | Roytman et al. | |
| 2017/0098161 A1 | 4/2017 | Ellenbogen et al. | |
| 2017/0255865 A1* | 9/2017 | Riscutia | H04L 67/22 |
| 2017/0293834 A1* | 10/2017 | Raison | G06F 40/35 |
| 2017/0329917 A1* | 11/2017 | McRaith | G16H 40/67 |
| 2017/0337838 A1* | 11/2017 | Elkon | G06F 3/048 |
| 2018/0052842 A1* | 2/2018 | Hewavitharana | G10L 15/26 |
| 2019/0142062 A1* | 5/2019 | Dayama | A24F 47/00 131/270 |

FOREIGN PATENT DOCUMENTS

| | | |
|---|---|---|
| CN | 105389097 A | 3/2016 |
| CN | 105512228 A | 4/2016 |
| CN | 106817342 A | 6/2017 |
| JP | 2004206590 A | 7/2004 |
| JP | 2005332127 A | 12/2005 |
| JP | 2015122104 A | 7/2015 |
| WO | 2012132947 A1 | 10/2012 |
| WO | 2019116339 A1 | 6/2019 |

OTHER PUBLICATIONS

International Search Report and Written Opinion for PCT/IB2018/060099 dated Apr. 17, 2019; 9 pages.
UK Examination Report under Section 18(3); Application No. GB2010430.3; Filed: Dec. 14, 2018; dated Aug. 20, 2020; 4 pages.
International Search Report for JP 2020-532926 dated May 16, 2022; 4 pages.

* cited by examiner

COMMUNICATION MODEL FOR COGNITIVE SYSTEMS

BACKGROUND

The present invention generally relates to cognitive systems, and more specifically, a model for communication between humans and cognitive systems.

Having a wider range of inputs and outputs, cognitive systems (CS) can receive sensor data to allow them to interpret their environment and provide feedback (outputs) to a user in ways that are beyond what a computer is normally capable of doing. A person normally senses and processes their environment using sight, sound, touch, scent, and taste, and communicates with language, vocal and physical expression, and action.

SUMMARY

Embodiments of the present invention are directed to a computer-implemented method for a cognitive system to interact with a user. A non-limiting example of the computer-implemented method includes receiving a cognitive system profile and observational data associated with the user, wherein at least a portion of the observational data is received from one or more sensors. Environmental data associated with the user is received and one or more features are extracted from the observations data and the environmental data. The one or more features are stored in the user profile and analyzed to determine a context for each of the one or more features based on the cognitive system profile and the user profile. One or more trigger events are identified based on the context for each of the one or more features. One or more proposed actions are determined based at least in part on the one or more trigger events. At least one action is initiated from the one or more proposed actions and are stored in the user profile along with the one or more trigger events and the one or more features.

Embodiments of the present invention are directed to a system for a cognitive system to interact with a user. A non-limiting example of the system includes receiving a cognitive system profile and observational data associated with the user, wherein at least a portion of the observational data is received from one or more sensors. Environmental data associated with the user is received and one or more features are extracted from the observations data and the environmental data. The one or more features are stored in the user profile and analyzed to determine a context for each of the one or more features based on the cognitive system profile and the user profile. One or more trigger events are identified based on the context for each of the one or more features. One or more proposed actions are determined based at least in part on the one or more trigger events. At least one action is initiated from the one or more proposed actions and are stored in the user profile along with the one or more trigger events and the one or more features.

Embodiments of the invention are directed to a computer program product for a cognitive system to interact with a user, the computer program product comprising a computer readable storage medium having program instructions embodied therewith. The program instructions are executable by a processor to cause the processor to perform a method. A non-limiting example of the method includes receiving a cognitive system profile and observational data associated with the user, wherein at least a portion of the observational data is received from one or more sensors. Environmental data associated with the user is received and one or more features are extracted from the observations data and the environmental data. The one or more features are stored in the user profile and analyzed to determine a context for each of the one or more features based on the cognitive system profile and the user profile. One or more trigger events are identified based on the context for each of the one or more features. One or more proposed actions are determined based at least in part on the one or more trigger events. At least one action is initiated from the one or more proposed actions and are stored in the user profile along with the one or more trigger events and the one or more features.

Embodiments of the present invention are directed to a computer-implemented method for a cognitive system to interact with a user. A non-limiting example of the computer-implemented method includes receiving, by a processor, a communication model comprising a set of instructions for communicating with the user. A user is prompted for user data based at least in part on the communication model. The user data is received from the user and stored in a user profile. The communication model is updated based at least in part on the user data, Embodiments of the present invention are directed to a computer program product for a cognitive system to interact with a user, the computer program product comprising a computer readable storage medium having program instructions embodied therewith. The program instructions are executable by a processor to cause the processor to perform a method. A non-limiting example of the method includes receiving, by a processor, a communication model comprising a set of instructions for communicating with the user. A user is prompted for user data based at least in part on the communication model. The user data is received from the user and stored in a user profile. The communication model is updated based at least in part on the user data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
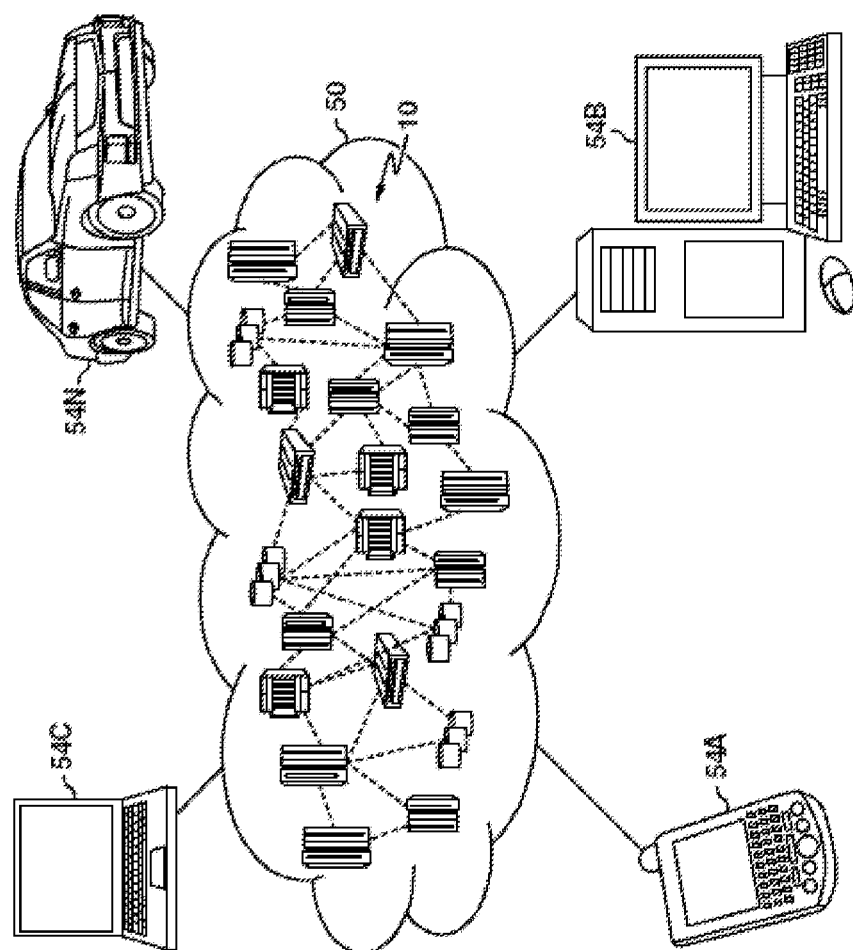
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
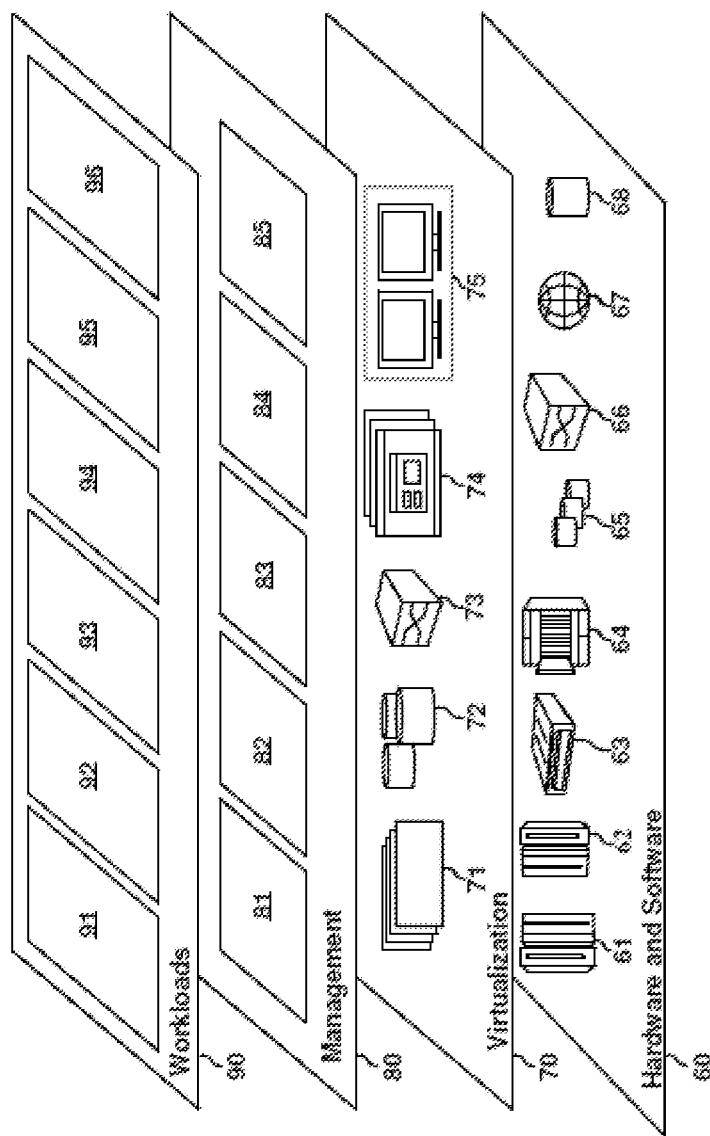
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive system interacting with a user 96.

Figure 3:
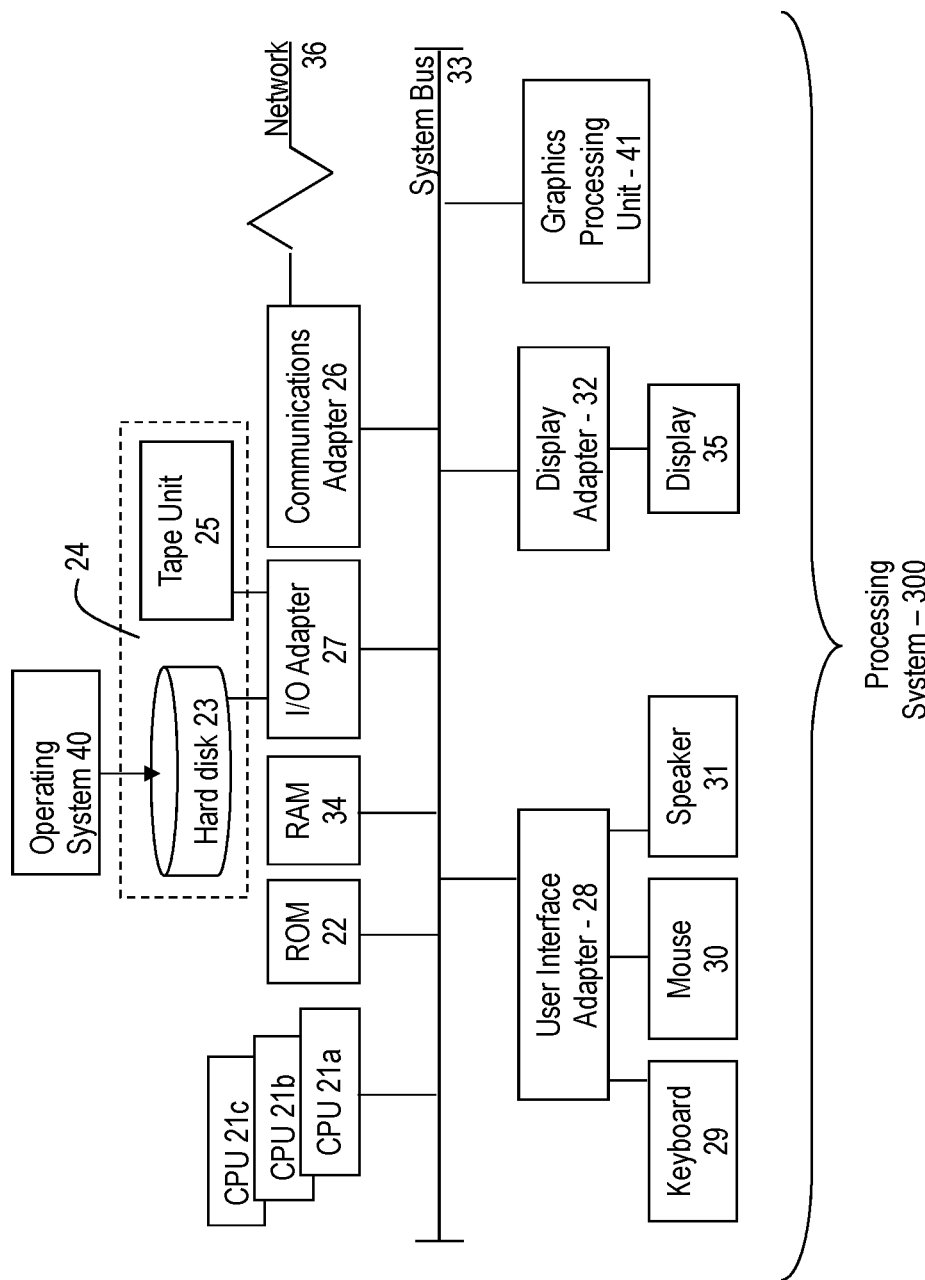
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, communication models (protocols) can be utilized to describe and communicate abstract concepts about an observable environment, e.g., the world around us. For example, the Shannon-Weaver model of communication is utilized to explain message transmission between machines. This model describes how a message leaves a sender and travels along a channel to a receiver while passing through noise. This model has since been applied to describe interpersonal communication and behavior. However, since the original intention of the model was to describe machine interaction, it fails to address the interpretation of context and the learning and improvement upon the failure or success of the transmission. The model, also, does not address the storage of message (i.e., memory) and the effect these messages can have on future messages.

Another communication model is the Emmert-Donaghy model of communication. This model elaborates on the Shannon-Weaver model to include the communicators' environmental context and the cognitive processing of the message by the receiver. The model describes the participation of two communicators sending feedback to one another, and the decoding of messages through thought processing. The model acknowledges that meaning cannot be separated from the message's context. While this model addresses the complexity of human-to-human communication, it fails to outline the purpose of communication, what happens to messages when new information is learned, and the storage of messages (i.e., memory).

Communicating effectively requires a deeper set of faculties—including perceiving the context of that communication, understanding the motivations of the communicating parties, reasoning about an appropriate response, and planning out the execution of that response that will have a maximum impact on the recipient. In one or more embodiments, aspects of the invention include a method for a cognitive system to embody a similar set of faculties to enable a much more natural form of interaction that will increase the impact the system has on the user's understanding, and to amplify their own cognitive processes.

Turning now to an overview of the aspects of the invention, one or more embodiments of the invention address the above-described shortcomings of the prior art by providing a communication protocol allowing a cognitive system to interact with a user. In one or more embodiments, the communication protocol models the complex interaction between a user and a cognitive system to more effectively design and output cognitive interactions (e.g., feedback to a user). Cognitive systems can receive input data in a range and precision that far exceeds that of a user. For example, sensors, such as light or motion sensors, can transmit sensor data to a cognitive system controller or "brain" for interpretation. Typically, this sensor data is transmitted to the cognitive system controller in an unstructured format that the cognitive system then organizes (i.e., structures) and interprets. Cognitive systems attempt to mimic human cognition to simulate the human mind using cognition.

Cognition is the mental action or process of acquiring knowledge and understanding through thought, experience, and the senses. Cognition describes how humans process thoughts to communicate with one another. For computers (e.g., cognitive systems), cognition describes a system that simulates human thought processing using algorithmic models intended to augment human cognitive capabilities. A cognitive system analyzes massive quantities of data to compose insightful, contextually aware, and continuously improving relationships with a user of the system. This growing knowledge of a user's needs, goal, and values allows a cognitive system to provide individualized responses, suggest relevant insights, and reveal contextually significant discoveries.

Figure 4:
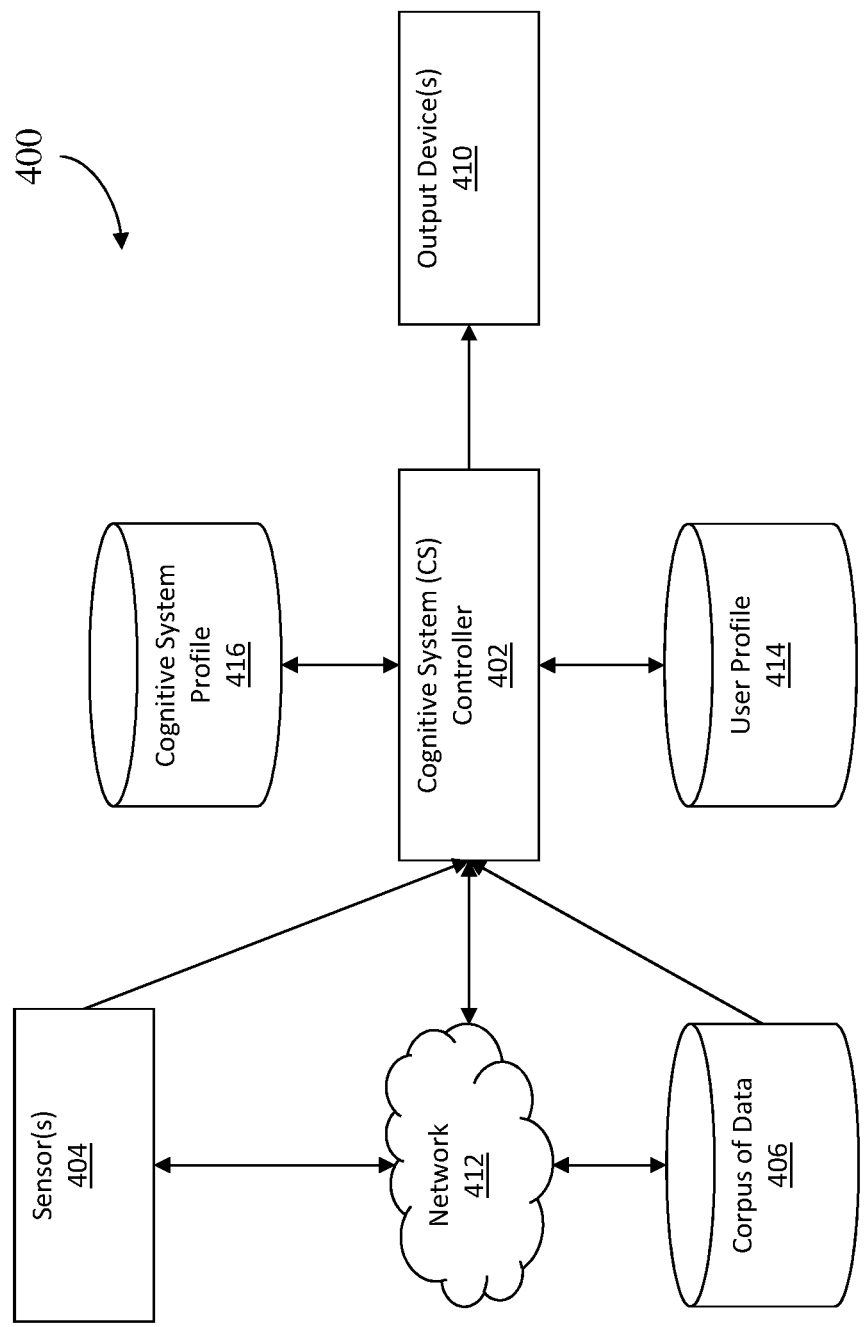
FIG. 4 depicts a system for a cognitive system to interact with a user according to embodiments of the invention.

Turning now to a more detailed description of aspects of the present invention, FIG. 4 depicts a system 400 for a cognitive system to interact with a user according to embodiments of the invention. The system 400 includes a cognitive system (CS) controller 402, one or more sensor(s) 404, and a corpus of data 406, one or more output device 410, a network 412, a user profile 414, and a cognitive system profile 416.

In one or more embodiments of the invention, the CS controller 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the invention, the CS controller 402 is in electronic communication with the one or more sensor(s) 404 through a wired or wireless connection. The one or more sensor(s) 404 can also be accessed through the network 412 by the CS controller 402. The CS controller 402 can interact with a user by utilizing the one or more sensor(s) 404 to collect observational data, environmental data, and user input data associated with a user of the system 400. The CS controller 402 can further interact with the user by utilizing one or more output device(s) 410. The one or more output device(s) 410 can be any of a smart device (e.g., phone, tablet, computer, watch, etc.), multi-modal devices and/or dumb devices (e.g., environmental tech, lighting, household appliances, speakers, etc.), automated mobility (e.g., cars, medicine carts, factory units, etc.), and humanoid devices (e.g., 2-dimensional anthropomorphic displays, 3-D anthropomorphic displays, etc.). In one or more embodiments, the output devices 410 can also receive user input or user feedback in addition to the one or more sensor(s) 404. In one or more embodiments, the out devices can be accessed through a network, such as the network 412 in FIG. 4.

In one or more embodiments, the system 400 includes a cognitive system profile 416. The cognitive system profile 416 includes certain ground truths about the system 400 and the domain in which the system operates. These ground truths can be pre-programmed to assist the CS controller 402 with receiving inputs and taking actions that are anticipated for a particular system. For example, a system built to assist an individual with health issues would have certain protocols in the cognitive system profile 416 for how to recognize the symptoms and consequences of certain types of health problems. The cognitive system profile 416 can include information about the nature of health issues, including, for example, how those issues can manifest as restrictions in a person's mobility, or how people with health issues might react to different environmental conditions. These insights assist the system 400 with interaction with the user and also include protocols for teaching the user how to interact with the system 400. The system 400 also includes a user profile 414 that stores information about a user through a combination of pre-programmed information, demographic information about the user, and collected information about the user (e.g., observational data). The user profile 414 is built and updated based on interactions between the system 400 and the user. For example, certain actions taken by the system 400 might yield responses from the user that would indicate that the user did not like a particular action. The system 400 would then analyze this action and the response to determine that the user does not enjoy this type of action in this type of situation and utilize this information to form and engage in future actions. For example, a cognitive system can decide not to interrupt a call with a work notification because, in the past, the user has dismissed similar notifications when on the phone with their family member. As another example, the system 400 can choose to alert a user to a news feed that they are not subscribed to because the user has recently been focusing on this new topic at their work. Or, as another example, the system 400 could listen to a meeting transcript and analyze the transcript to take the action of sending the team involved in the meeting some feedback to improve how the team runs the meeting along with sending the team the meeting minutes. As the system 400 interacts with the user and receives feedback/user input from the user, the system will update the user profile 414. Likewise, as the system 400 interacts with the user, it may learn new things about how the world works and will update the system profile 416 with that new knowledge. In addition, any insights gained from the interaction may be stored in the system profile 416.

In one or more embodiments, the user of the system 400 interacts with the system 400 through the one or more sensors 404 and/or the output devices 410. The one or more sensors 404 can be any type of sensor such as, for example, cameras, temperature sensors, pressures sensors, chemical sensors, and the like. The interactions of the user can be verbal and/or non-verbal. An example verbal interaction can be a user speaking to the system 400 and the verbal data (e.g., natural language) being collected by a sensor such as a microphone. The system 400 can receive a natural language input from the user and analyze the input utilizing natural language processing (NLP). NLP is utilized to derive meaning from natural language. That is, a user provided natural language input is analyzed by the system 400 (e.g., CS Controller 402) by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by a computer to identify and generate potential responses to the collected natural language input. These NLP structures include a translation and/or interpretation of the natural language input, including synonymous variants thereof. NLP can also be utilized for answer generation to convert information from a corpus of data 406 into natural language output through an output device 410.

In one or more embodiments, the cognitive system profile 416 and/or the user profile 414 can include information about the user, such as, for example, demographic information. The demographic information can include data about the user such as age, income level, and the like. In another embodiment, the cognitive system profile 416 can include general data about user demographics that are not specific to the user. For example, the cognitive system profile 416 could include information about what type of music individuals listen to that fit into certain demographic categories such as age, etc. The cognitive system profile 416 can be utilized to provide responses or take actions by the system 400 while the system 400 is continuing to collect information about the user to store in the user profile 414. For example, the system 400 could receive a verbal request from a user to play some music. The system 400 would access the user profile 414 to see if there was some historical data regarding music for the user. In the absence of historical data or limited historical data, the system 400 could access demographic data over a population that matched the user to determine a music type that the user might enjoy. Based on the user's feedback (or lack of feedback), the system 400 would update the user profile 414 to determine a type of music, a particular artist, and the like for future interactions with the user. As a user interacts with the system 400, information is continuously being collected to gain insight into the user and further analyzed to drive additional interactions with the user.

In one or more embodiments, the user profile 414 is continuously updated to allow the system to fulfill the needs, values, and the expectations of a user. When data associated with the user is collected, the system will seek to understand the motivation behind this data. For example, a user may ask the system 400 a question about the weather in another city. The system 400 would analyze the user profile 414 as well as any available observational data and environmental data to understand why the user asked this particular question. For example, the user profile 414 might include information about the user having family in the city or the user may have a trip planned to the city in the near future as observed from the user's electronic calendar. The system 400 would determine a motivation for the particular question and, utilizing this motivation, could return an answer regarding the current weather for the city and a forecast weather for the city to correspond to the user's travel plans to this city. Or the system 400 could mention a family member of the user who is in the city along with the weather forecast by saying, "Your cousin, George, is enjoying the sunny weather today."

In one or more embodiments, the system 400 can include a cognitive system profile 416 that is tailored to a particular use scenario such as, for example, the layout and contact list for an assisted living service (ALS) facility. In this example, the system 400 can have pre-programmed information for interacting with an ALS patient such as emergency protocols and the like. The system 400 interacts with the patient by prompting responses with open-ended questions. An example question would be, "Hello, nice to meet you. Can you tell me a story about one of your happy memories?" The prompted question should elicit a response from the user utilizing natural language as an input. This natural language input can be gathered by the system 400 utilizing the one or more sensors 404. NLP analysis, as mentioned above, can be utilized to extract features from the natural language. The CS controller 402 can analyze the features to determine a context for the features and store the features in the user profile 414. As the system 400 interacts with the user, observational data and environmental data is continuously collected about the user and stored in the user profile 414. Based on open-ended questions prompted by the system 400, the system 400 collects data regarding various aspects about the user's identity, preferences, history, limitations, restrictions, and, also, networked devices (e.g., tablets, phones, etc.). The prompted questions are tailored through the use of the cognitive system profile 416 and the user profile 414. In one or more embodiments, as observational data regarding the user is collected, the user profile 414 might be utilized more than the cognitive system profile 416 to interact with the user. The system 400 can determine goals of the patient, the facility, the patient's family, and even the patient's doctor through the information gathered.

In one or more embodiments, the system 400 can take one or more actions in response to a trigger event. The trigger event is determined based on observational data, environmental data, the user profile 414, and the cognitive system profile 416. A trigger event could be a question asked by the user. For example, the user asks, "What time is my appointment?" Based on the NLP analysis and feature extraction from the NLP, the CS controller 402 would determine that the question is a trigger event that would need to be responded to (i.e., take an action) by the system 400. The CS controller 402 would extract features from the question such as "time" and "appointment" and utilize these features to determine a context of the question by the user. In this sense, the context is utilized to determine why the user asked this particular question and in reference to what appointment is the question directed. The CS controller 402 can access the user profile 414 to search for any upcoming appointments that were previously mentioned by the user and/or analyze the user's electronic calendar to determine if an appointment is present on the calendar. If multiple appointments exist, the CS controller 402 utilizing the context of the question would return the most recent appointment as the user did not specify a type of appointment. Additionally, the CS controller 402, based on the user profile 414 and previous observational data about the user, might determine that the user is referring to a medical appointment instead of a social appointment and would return information about the medical appointment even though a social appointment might precede the medical appointment. Based on the example question, the CS controller 402 might elicit further information from the user if it is unable to identify the appointment. For example, the CS Controller 402 might follow up by asking, through an output device 410 such as a speaker, "Do you mean your appointment with Dr. Burdell?" The doctor's name could be accessed from the user profile 414 based on previous observational data about the user where the system 400 extracted the doctor's name from open ended questions. In one or more embodiments of the invention, environmental data is not limited to data about the current, physical environment. Context of this environmental data is determined to include any previous assertions that the user has made in the relevant preceding time frames that informs the intent and motivations of the user. That is to say, a situational context is determined that has both a physical (e.g., environmental) and a time-history (e.g., previously stated assertions) dimensions to it.

In one or more embodiments, the system 400 can identify trigger events through observation data collected from the patient through the one or more sensors 404 other than auditory or verbal data. For example, if based on the user profile 414, the system 400 has access to a user's medication schedule, the system 400 can track through the one or more sensors 404 as to whether the user has taken a medication at a prescribed time. If medications are to be taken in the morning and based on visual sensors and a heart rate monitor, the cognitive system controller 402 can determine the user is awake but has not taken their medication. The system 400 can determine that this scenario is a trigger event and take one or more actions with the user. For example, the system 400 could audibly remind the patient or put a message on an output device 410 reminding the user to take the medication. Other examples could include changing the lighting in the room to alert the user or playing an alarm for the user. To determine what action to take, the system 400 could develop multiple actions and rank each action based on the cognitive system profile 416, the user profile 414, and collect additional observational data and/or environmental data. The one or more sensors 404 could collect data indicating that the user is pouring a glass of water which is usually associated with the user taking the medication. Based on this action, the system 400 may identify the user is about to take the medication and not take any action or only take a softer action to guide the user to take the medication. A softer action could include telling the user, "When you have finished taking your medication, would you like to watch a movie?" The type of action taken can depend on the ranking determined by the CS controller 402.

In one or more embodiments, the system 400 collects contextual history from a user profile 414, insight from a system profile 416, and collects observational data associated with the user and the user's situational context. The situational context is a combination of environmental data and stated assertions provided by the user. At least a portion of the observational data is received from the sensors 404. One or more features are extracted from the observations data and the situational context. The one or more features, also referred to as "perception," are stored in the user profile 414 and analyzed to determine one or more trigger events.

In one or more embodiments, other trigger events can include inaction or other visually observable or audibly observable data about the user. In the ALS patient example, the system 400 could collect data about the patient such as, for example, the patient has been staring out the window for a length of time with little or no movement. Additional information such as facial recognition data can be taken by the one or more sensor(s) 404 to determine a mood (sometimes referred to as, "sentiment") of the patient. Sentiment analysis can be utilized to determine the sentiment/mood of the patient based on the visual or auditory data collected. Sentiment analysis can use knowledge based learning programming to learn the patient's characteristic expressions to more accurately determine the sentiment of the characteristic expressions. Sentiment analysis can on each use or periodically, retrieve from the user profile 414 previously conducted sentiment analyses to determine characteristic expressions of the user based on historical sentiment analysis data and analyze previous sentiment analyses to refine and improve sentiment analysis for the user. For example, a user may characteristically exhibit a knit brow. Normally, a sentiment analysis of a user with a knit brow may indicate sentiment such as slight confusion. However, sentiment analysis can determine, based on a review of stored, historical sentiment analysis of the user that for this user exhibiting a knit brow is a characteristic expression and indicates a neutral sentiment. The knit brow, in this example, is a characteristic facial expression which may not equate with confusion but, instead may be a result of a vision challenge that causes the user to squint or knit his or her brow. Sentiment analysis analyzes the user's facial expressions and facial movements looking at both an individual facial feature and a totality of the facial features for an expression on the face. Using facial recognition techniques, sentiment analysis compares the individual facial features and expressions on the face of the user to similar facial features and facial expressions for known sentiment expressions to determine or match a corresponding sentiment.

Based on the patient's lack of movement and facial expressions made while staring out the window, the system 400 may identify this as a trigger event for which the system 400 will take one or more actions. The one or more actions could include playing some uplifting music to attempt to cheer up the patient and/or changing the lighting on the inside of the room. Also, the system 400 may simply prompt the patient with a suggested action for the user such as, "Would you like to watch a movie today?" The suggested actions could be derived from a combination of the observational data, environmental data, and the user profile 414. For example, based on the user's inaction, the system 400 may determine the user is bored. Additional information is collected regarding the time and weather. The weather data may indicate rain which is not conducive to outdoor activity. The time data might indicate that it is later in the day and almost time for the patient to go to bed per the patient's routine stored in the user profile 414. The user profile 414 can also include information about how the patient enjoys some entertainment before going to sleep. Also, the user profile 414 data and observational data can indicate that based on the time of day, the patient's friends are most likely occupied with their own evening routines and would not necessarily be accepting visitors. The movie suggestion by the system 400 could include genres that the patient has indicated a preference for in the past and stored in the user profile 414. The system 400 could confirm the patient's interest in the movie by receiving a response to the question in the affirmative from the patient. Having confirmed the patient's interest in a movie, several movie options could be presented to the user by the system 400 in the patient's preferred genres. In preparation for displaying the movie, the system 400 could close the drapes in the patient's room, turn down the lighting, adjust the room temperature, turn on the television, and select the movie from a video library. Additional observational data and environmental data can be collected by the one or more sensor(s) 404 such as, for example, the patient indicates that he or she is uncomfortable with the room temperature and the system 400 can adjust the temperature accordingly. Additionally, the patient may fall asleep during the movie and the system 400 can pause the movie until the patient wakes or decides to go to bed.

In one or more embodiments, the sentiment analysis described above can be performed by a sentiment analysis module on the CS controller 402. In addition, tonal analysis can be performed by a tonal analysis module on the CS controller 402 to determine a tone of the user when providing input for the system 400. The sentiment analysis module can be utilized for evaluating the sentiment quality of a user input or action. Sentiment analysis may be provided by IBM® WATSON® Alchemy Language application program interface (API) or WATSON® Natural Language Understanding API. The above mentioned APIs are mentioned for exemplary purposes. Any cognitive system can be utilized within the sentiment analysis module. The sentiment analysis module can process natural language to incorporate both a linguistic and statistical analysis in evaluating the context of a user input. In text analysis (e.g., from an input device such as a tablet), the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The tonal analysis module may be IBM® WATSON® Tone analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's speaking style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the user's degree of certainty. The confidence style may be provided a value range if the text contains little or no evidence of confidence in tone or alternatively a higher value range if the style is more likely to be perceived as assured, collected, hopeful or egotistical. The tentative style may focus on the user's degree of inhibition. The tentative style may be provided a lower value range if the text contains little or no evidence of tentativeness in tone or a higher value range if the style is more likely to be perceived as questionable, doubtful limited, or debatable.

In one or more embodiments, the cognitive system profile 416 can include a communication profile with instructions for interacting with a user and can be tailored to specific tasks and actions that are suited to a particular user. For example, the system 400 could be utilized to assist an airline pilot and an initial communication profile could be preprogrammed to include information about flying a particular airplane and access certain types of data pertinent to operating the airplane. As the system 400 interacts with the pilot, a user profile 414 for the pilot can be created that will adjust the communication profile for the particular pilot.

In one or more embodiments, the output device 410 could be a display screen which can display an avatar of the system 400 or any computer generated graphic to assist with interacting with the user. The avatar could have human-like features and react to inputs from the user by smiling, nodding, and/or making thoughtful sounds when the user is talking to the system 400.

Figure 5:
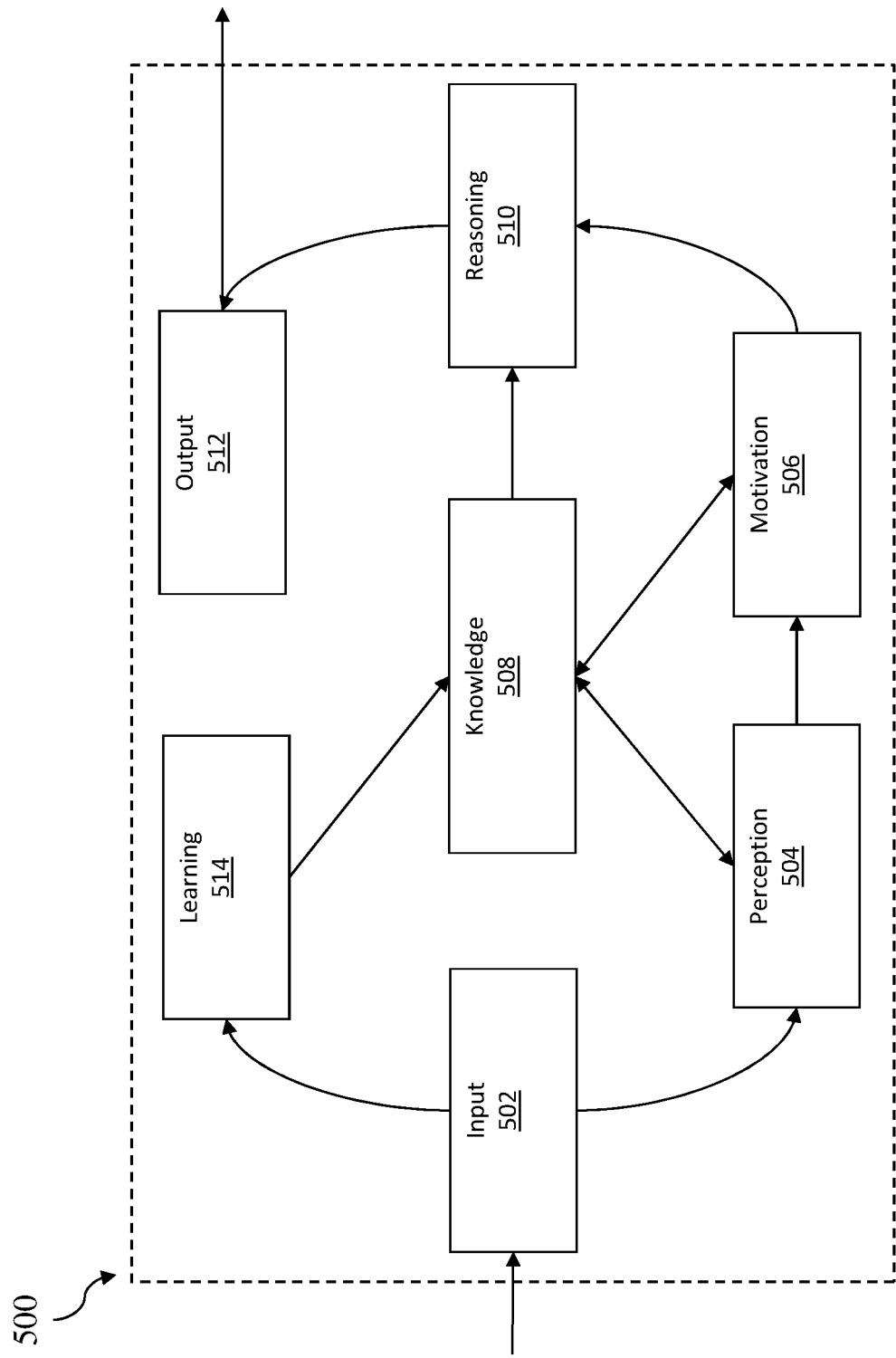
FIG. 5 depicts a flow diagram of a method for a cognitive system to interact with a user according to one or more embodiments of the invention.

In one or more embodiments, the cognitive system 400 utilizes an algorithm to identify and enact proposed actions by the system 400. FIG. 5 depicts a block diagram of the algorithm that determines an output according to one or more embodiments of the present invention. The algorithm 500 receives one or more inputs 502. As described above the inputs 502 can be received from one or more sensors 402 and include observational data and/or environmental data associated with a user or associated with a particular task of the cognitive system 400. The algorithm 500 utilizes inputs to determine an output 512 (e.g., an action). The algorithm 500 receives raw, unstructured data and incoming messages as an input 502. The algorithm 500 organizes and interprets this data. Perception 504 is the process of organizing the unstructured data into meaning. When the data and/or messages are received from the input 502, the information is organized and interpreted so that the CS system 400 can provide an action in response to the input in an appropriate manner. Environmental and conversational context are also identified utilizing perception 504 by the algorithm 500 to match the appropriateness of the output 512.

In one or more embodiments of the present invention, when a CS system 400 has evaluated its surroundings, the system 400 can then provide an action. However, to create the highest or best outcome, the system 400 needs a clear purpose, set of goals, and set of values to follow. The system's 400 purpose can be established prior to the manufacture of the system. For example, a system 400 may have a purposed defined as moving boxes in a warehouse, providing concierge services to hotel guests, taking care of an elderly patient, or assisting a manager with solving a problem. Goals of the system 400 can be pre-programmed to align with the system's overall purpose. For example, a robot built to move boxes in a warehouse will have the goal of not dropping any boxes. However simple the goal, the system 400 needs many different skills to make sure that the boxes are not dropped regardless of external influences. Certain conditions such as, for example, the box being too heavy or someone is attempting to push a box off the robot can cause issues with the system goals. A programmer for the robot would need to consider what skills for the robot are needed to solve problems around the goal and describe how the system responds to external influences. These goals and overall purpose can be considered the motivation 506 portion of the algorithm 500.

In one or more embodiments of the invention, the process of reasoning 510 is making logical decisions and deciding on the best actions to take based on the information from the input 502, the perception 504, the motivation 506, and the knowledge (memory) 508. Higher reasoning skills generally are distinguished as being directly responsible for powering the augmentation of human cognition, e.g., the principal goal of cognitive computing and cognitive systems. Reasoning 510 includes carrying on a conversation with the human, interacting with them to progress them towards a known or novel goal, offering them a perspective that they would likely not have derived on their own, or simply providing them the right information at the right time to help them make better decisions. Reasoning 510 also includes any reasoning strategies that might be needed to answer their questions. For example, conversations, deep question-answering (deep-QA), discovery, and compliance can be considered as reasoning 510.

In one or more embodiments of the invention, identifying whether an action was successful in accomplishing a desired result can improve a system's ability to provide future actions. If the action is not successful or not noticed by a user, for example, the system 400 utilizing learning 514 will seek to understand how and why the particular action failed to achieve the desired result and utilize this understanding to improve on future actions. Identification of a desired result can be achieved through user feedback which, utilizing learning 514, can adjust the algorithm 500 to perform the same action or perform a new or different action as an output 512.

In one or more embodiments of the present invention, when the cognitive systems 400 sends a message, it is received by a user who mentally decodes the message. A person then creates a new message to respond to the CS using the human cognitive process, and returns a new message to the CS. Messages pass back and forth between the person and CS until one or the other completes a goal or task. Communication is not limited to auditory signaling, but includes visual and physical signals. Sometimes these modes of signaling are individually expressed, such as telling a user a task is complete, and other times the signals are choreographed together, such as telling a user a task is complete and turning on a light. How these modes are choreographed together and the associated tonal expression create an emergent personality, and is what encourages user to continue to engage with the cognitive system.

Figure 6:
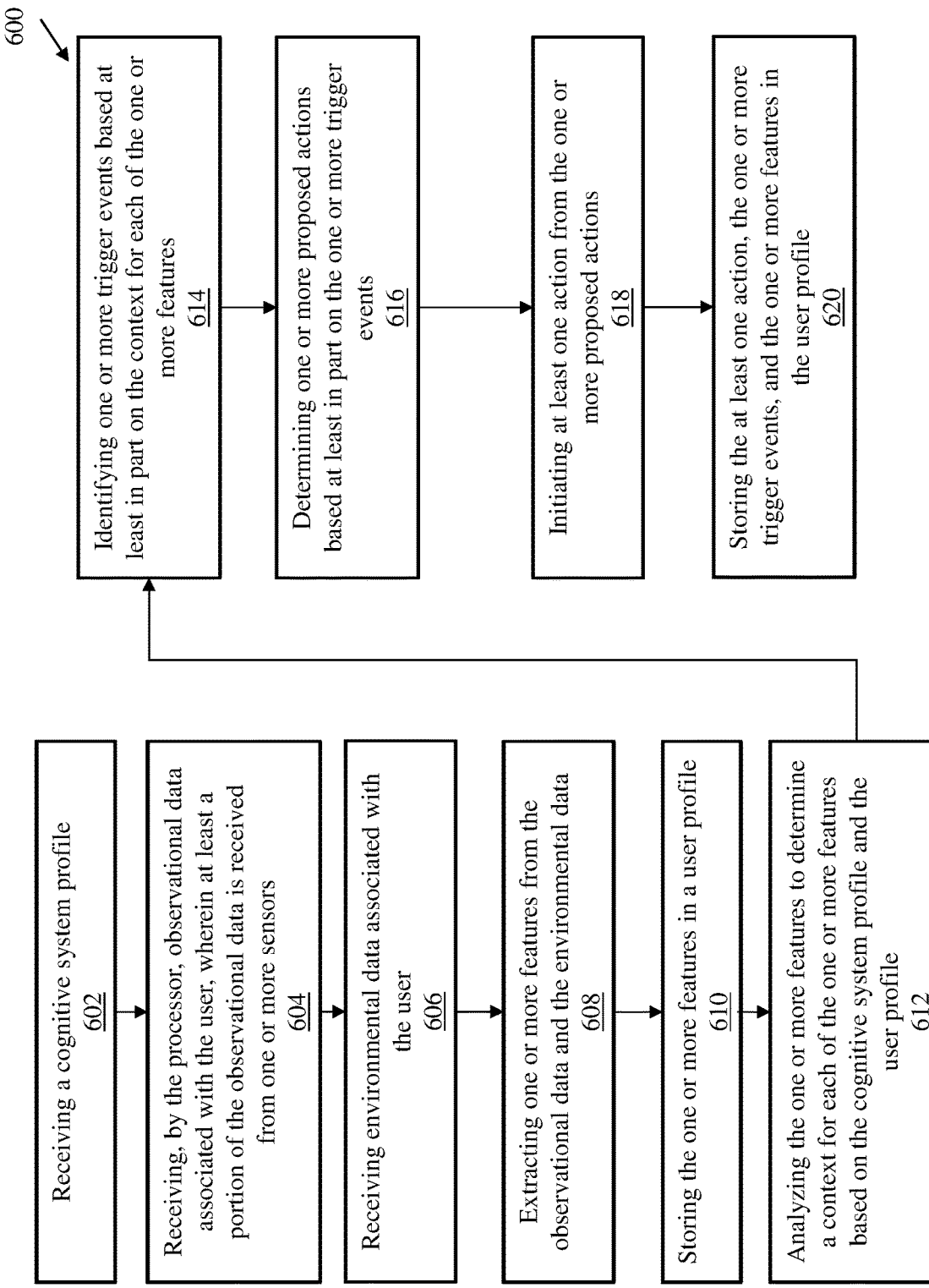
FIG. 6 depicts a flow diagram of a method for a cognitive system to interact with a user according to one or more embodiments of the invention.

FIG. 6 depicts a flow diagram of a method for a cognitive system to interact with a user according to one or more embodiments of the invention. The method 600 includes receiving, by a processor, a cognitive system profile, as shown at block 602. At block 604, the method 600 includes receiving, by the processor, observational data associated with the user, wherein at least a portion of the observational data is received from one or more sensors. The method 600, at block 606, includes receiving environmental data associated with the user. At block 608, the method 600 includes extracting one or more features from the observational data and the environmental data. The method 600 includes storing the one or more features in a user profile, as shown at block 610. At block 612, the method 600 includes analyzing the one or more features to determine a context for each of the one or more features based on the cognitive system profile and the user profile. The method 600, at block 614, includes identifying one or more trigger events based at least in part on the context for each of the one or more features. At block 616, the method 600 includes determining one or more proposed actions based at least in part on the one or more trigger events. The method 600 includes initiating at least one action from the one or more proposed actions, as shown at block 618. At block 620, the method 600 includes storing the at least one action, the one or more trigger events, and the one or more features in the user profile.

Additional processes may also be included. It should be understood that the processes depicted in FIG. 6 represent illustrations and that other processes may be added or existing processes may be removed, modified, or rearranged without departing from the scope and spirit of the present disclosure.

Figure 7:
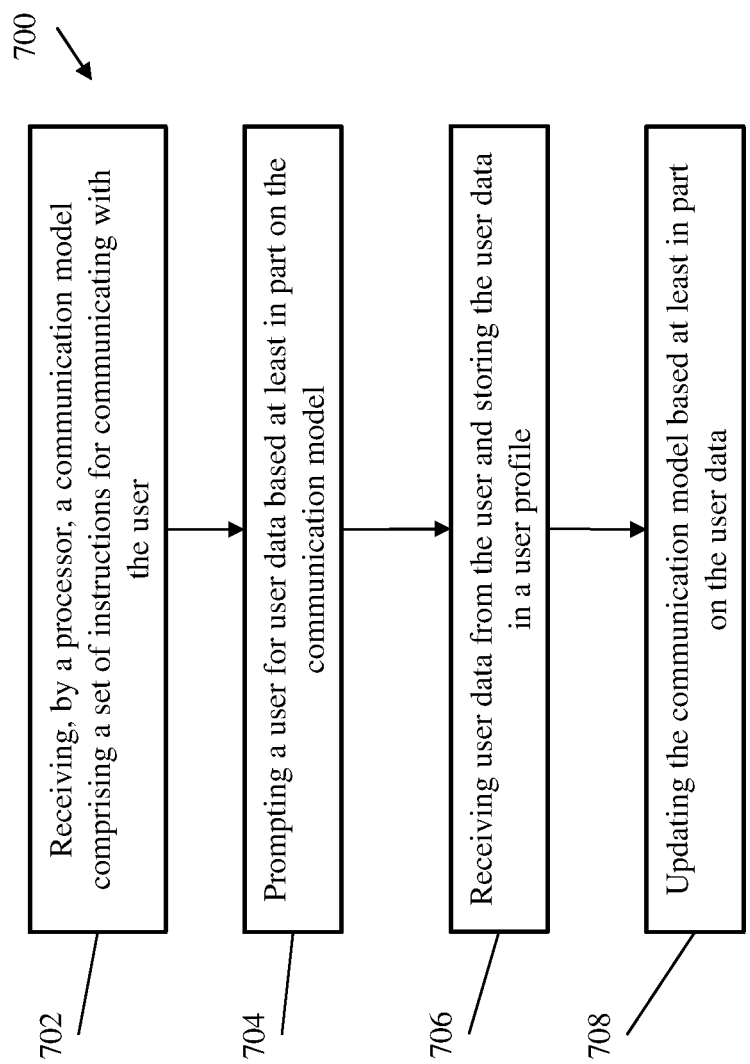
FIG. 7 depicts a flow diagram of a method for a cognitive system to interact with a user according to one or more embodiments of the invention.

FIG. 7 depicts a flow diagram of a method for a cognitive system to interact with a user according to one or more embodiments of the invention. The method 700 includes receiving, by a processor, a communication model comprising a set of instructions for communicating with the user, as shown at block 702. The method 700, at block 704, includes prompting a user for user data based at least in part on the communication model. At block 706, the method 700 includes receiving user data from the user and storing the user data in a user profile. The method 700 includes updating the communication model based at least in part on the user data, at block 708.

Additional processes may also be included. It should be understood that the processes depicted in FIG. 7 represent illustrations and that other processes may be added or existing processes may be removed, modified, or rearranged without departing from the scope and spirit of the present disclosure.

Technical benefits include a method for a cognitive system to embody a similar set of faculties to enable a much more natural form of interaction with a user that will increase the impact the system has on the user's understanding, and to amplify their own cognitive processes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for a cognitive system to interact with a user, the method comprising:
    receiving, by a processor, a cognitive system profile;
    receiving, by the processor, observational data associated with the user, wherein at least a portion of the observational data is received from one or more sensors;
    receiving environmental data associated with the user;
    extracting one or more features from the observational data and the environmental data;
    storing the one or more features in a user profile;
    analyzing the one or more features to determine a situational context for each of the one or more features based on the cognitive system profile and the user profile;
    identifying one or more trigger events based at least in part on the situational context for each of the one or more features;
    determining one or more proposed actions based at least in part on the one or more trigger events;
    eliciting further information from the user based on the one or more proposed actions and the observational data;
    initiating at least one action from the one or more proposed actions, wherein selecting the at least one action to be initiated is further based on the further information, and wherein the initiating the at least one action from the one or more proposed actions comprises:
        ranking each of the one or more proposed action; and
        initiating at least one action from the one or more proposed actions based at least in part on a rank of the at least one action;
    storing the at least one action, the one or more trigger events, and the one or more features in the user profile;
    responsive to initiating the at least one action, soliciting feedback from the user, wherein soliciting feedback from the user comprises displaying, on a display device, an anthropomorphic display for the user to provide the feedback;
    wherein, in response to monitoring the user and based on the observational data determined to include a lack of movement for the user and a facial expression for the user, the processor is configured to collect time information indicating a time of day; and
    wherein, in response to the lack of movement, the facial expression, and the time of day, the processor is configured to suggest entertainment for the user.

2. The computer-implemented method of claim 1 further comprising:
    responsive to initiating the at least one action, receiving user input data;
    extracting one or more user input features from the user input data;
    analyzing the one or more user input features to determine a situational context for each of the one or more user input features;
    updating the user profile based on the situational context for each of the one or more features;
    based at least in part on the situational context of the one or more user input features, adjusting the one or more proposed actions;
    initiating at least one new action from the one or more proposed actions;
    storing the at least one new action and the one or more user input features in the user profile.

3. The computer-implemented method of claim 1, wherein the determining the situational context for each of the one or more features comprises:
    analyzing the user profile comprising historical data including previous features extracted from previous observational data and previous environmental data; and
    comparing the one or more features to the previous features to determine the situational context for each of the one or more features, wherein a situational context is associated with each of the previous features.

4. The computer-implemented method of claim 1, further comprising:
receiving, by the processor, additional observational data associated with the user;
receiving additional environmental data;
extracting one or more additional features from the additional observational data and the additional environmental data;
comparing the one or more additional features to the one or more features to identify to determine that a threshold level of change exists;
based at least in part on a determination that the threshold level of change exists, analyzing the one or more additional features to determine a situational context for each of the one or more additional features; and
updating the one or more proposed actions based at least in part on the situational context for each of the one or more additional features.

5. The computer-implemented method of claim 4, further comprising:
based at least in part on a determination that the threshold level of change does not exist, adjusting the one or more proposed actions; and
initiating at least one new action from the one or more proposed actions.

6. The computer-implemented method of claim 1, wherein the cognitive system profile comprises:
a communication protocol comprising instructions for interacting with the user.

7. A system for a cognitive system to interact with a user, the system comprising:
a processor communicatively coupled to a memory, the processor configured to:
receive a cognitive system profile;
receive observational data associated with the user, wherein at least a portion of the observational data is received from one or more sensors;
receive environmental data associated with the user;
extract one or more features from the observational data and the environmental data;
store the one or more features in a user profile;
analyze the one or more features to determine a situational context for each of the one or more features based on the cognitive system profile and the user profile;
identify one or more trigger events based at least in part on the situational context for each of the one or more features;
determine one or more proposed actions based at least in part on the one or more trigger events;
elicit further information from the user based on the one or more proposed actions and the observational data;
initiate at least one action from the one or more proposed actions, wherein selecting the at least one action to be initiated is further based on the further information, and wherein the initiating the at least one action from the one or more proposed actions comprises:
ranking each of the one or more proposed action; and
initiating at least one action from the one or more proposed actions based at least in part on a rank of the at least one action;
store the at least one action, the one or more trigger events, and the one or more features in the user profile; and
responsive to initiating the at least one action, solicit feedback from the user, wherein soliciting feedback from the user comprises displaying, on a display device, an anthropomorphic display for the user to provide the feedback;
wherein, in response to monitoring the user and based on the observational data determined to include a lack of movement for the user and a facial expression for the user, the processor is configured to collect time information indicating a time of day; and
wherein, in response to the lack of movement, the facial expression, and the time of day, the processor is configured to suggest entertainment for the user.

8. The system of claim 7, wherein the processor is further configured to:
responsive to initiating the at least one action, receive user input data;
extract one or more user input features from the user input data;
analyze the one or more user input features to determine a situational context for each of the one or more user input features;
update the user profile based on the situational context for each of the one or more features;
based at least in part on the situational context of the one or more user input features, adjust the one or more proposed actions;
initiate at least one new action from the one or more proposed actions;
store the at least one new action and the one or more user input features in the user profile.

9. The system of claim 7, wherein the determining the situational context for each of the one or more features comprises:
analyzing the user profile comprising historical data including previous features extracted from previous observational data and previous environmental data; and
comparing the one or more features to the previous features to determine the situational context for each of the one or more features, wherein a situational context is associated with each of the previous features.

10. The system of claim 7, wherein the processor is further configured to:
receive additional observational data associated with the user;
receive additional environmental data;
extract one or more additional features from the additional observational data and the additional environmental data;
compare the one or more additional features to the one or more features to identify to determine that a threshold level of change exists;
based at least in part on a determination that the threshold level of change exists, analyze the one or more additional features to determine a situational context for each of the one or more additional features; and
update the one or more proposed actions based at least in part on the situational context for each of the one or more additional features.

11. The system of claim 10, wherein the processor is further configured to:

based at least in part on a determination that the threshold level of change does not exist, adjust the one or more proposed actions; and initiate at least one new action from the one or more proposed actions.

12. The system of claim 7, wherein the cognitive system profile comprises:

a communication protocol comprising instructions for interacting with the user.

13. A computer program product for a cognitive system to interact with a user comprising a computer readable storage medium having program instructions embodied therewith, where the program instructions are executable by a processor to cause the processor to perform a method comprising:

receiving a cognitive system profile;

receiving, by a processor, observational data associated with the user, wherein at least a portion of the observational data is received from one or more sensors;

receiving environmental data associated with the user;

extracting one or more features from the observational data and the environmental data;

storing the one or more features in a user profile;

analyzing the one or more features to determine a situational context for each of the one or more features based on the cognitive system profile and the user profile;

identifying one or more trigger events based at least in part on the situational context for each of the one or more features;

determining one or more proposed actions based at least in part on the one or more trigger events;

eliciting further information from the user based on the one or more proposed actions and the observational data;

initiating at least one action from the one or more proposed actions, wherein selecting the at least one action to be initiated is further based on the further information, and wherein the initiating the at least one action from the one or more proposed actions comprises:
ranking each of the one or more proposed action; and
initiating at least one action from the one or more proposed actions based at least in part on a rank of the at least one action;

storing the at least one action, the one or more trigger events, and the one or more features in the user profile; and responsive to initiating the at least one action, soliciting feedback from the user, wherein soliciting feedback from the user comprises displaying, on a display device, an anthropomorphic display for the user to provide the feedback;

wherein, in response to monitoring the user and based on the observational data determined to include a lack of movement for the user and a facial expression for the user, the processor is configured to collect time information indicating a time of day; and wherein, in response to the lack of movement, the facial expression, and the time of day, the processor is configured to suggest entertainment for the user.

14. The computer program product of claim 13, further comprising:

responsive to initiating the at least one action, receiving user input data;

extracting one or more user input features from the user input data;

analyzing the one or more user input features to determine a situational context for each of the one or more user input features;

updating the user profile based on the situational context for each of the one or more features;

based at least in part on the situational context of the one or more user input features, adjusting the one or more proposed actions;

initiating at least one new action from the one or more proposed actions;

storing the at least one new action and the one or more user input features in the user profile.

15. The computer program product of claim 13, wherein the determining the situational context for each of the one or more features comprises:

analyzing the user profile comprising historical data including previous features extracted from previous observational data and previous environmental data; and comparing the one or more features to the previous features to determine the situational context for each of the one or more features, wherein a situational context is associated with each of the previous features.

16. The computer program product of claim 13, further comprising:

receiving, by the processor, additional observational data associated with the user;

receiving additional environmental data;

extracting one or more additional features from the additional observational data and the additional environmental data;

comparing the one or more additional features to the one or more features to identify to determine that a threshold level of change exists;

based at least in part on a determination that the threshold level of change exists, analyzing the one or more additional features to determine a situational context for each of the one or more additional features; and updating the one or more proposed actions based at least in part on the situational context for each of the one or more additional features.

17. The computer program product of claim 16, further comprising:

based at least in part on a determination that the threshold level of change does not exist, adjusting the one or more proposed actions; and initiating at least one new action from the one or more proposed actions.

18. The computer program product of claim 13, wherein the cognitive system profile comprises:

a communication protocol comprising instructions for interacting with the user.

19. A computer-implemented method a cognitive system to interact with a user, the method comprising:

receiving, by a processor, a communication model comprising a set of instructions for communicating with the user;

prompting a user for user data based at least in part on the communication model, wherein prompting the user for user data comprises displaying, on a display device, an interactive anthropomorphic display for the user to provide the user data;

receiving user data from the user and storing the user data in a user profile; and updating the communication model based at least in part on the user data;

obtaining observational data associated with the user;

determining one or more proposed actions based at least in part on the user data and the observational data;
eliciting further information from the user based on the one or more proposed actions and the observational data;
initiating at least one action from the one or more proposed actions, wherein selecting the at least one action to be initiated is further based on the further information, and wherein the initiating the at least one action from the one or more proposed actions comprises:
ranking each of the one or more proposed action; and
initiating at least one action from the one or more proposed actions based at least in part on a rank of the at least one action;
wherein, in response to monitoring the user and based on the observational data determined to include a lack of movement for the user and a facial expression for the user, the processor is configured to collect time information indicating a time of day; and
wherein, in response to the lack of movement, the facial expression, and the time of day, the processor is configured to suggest entertainment for the user.

20. The computer-implemented method of claim 19, further comprising:
prompting the user for additional user data based at least in part on the communication model and the user profile, updating the communication model based at least in part on the additional user data.

21. A computer program product for a cognitive system to interact with a user comprising a computer readable storage medium having program instructions embodied therewith, where the program instructions are executable by a processor to cause the processor to perform a method comprising:
receiving a communication model comprising a set of instructions for communicating with the user;
prompting a user for user data based at least in part on the communication model, wherein prompting the user for user data comprising displaying, on a display device, an interactive anthropomorphic display for the user to provide the user data;
receiving user data from the user and storing the user data in a user profile; and
updating the communication model based at least in part on the user data;
obtaining observational data associated with the user;
determining one or more proposed actions based at least in part on the user data and the observational data;
eliciting further information from the user based on the one or more proposed actions and the observational data;
initiating at least one action from the one or more proposed actions, wherein selecting the at least one action to be initiated is further based on the further information, and wherein the initiating the at least one action from the one or more proposed actions comprises:
ranking each of the one or more proposed action; and
initiating at least one action from the one or more proposed actions based at least in part on a rank of the at least one action;
wherein, in response to monitoring the user and based on the observational data determined to include a lack of movement for the user and a facial expression for the user, the processor is configured to collect time information indicating a time of day; and
wherein, in response to the lack of movement, the facial expression, and the time of day, the processor is configured to suggest entertainment for the user.

22. The computer program product of claim 21, further comprising:
prompting the user for additional user data based at least in part on the communication model and the user profile,
updating the communication model based at least in part on the additional user data.

23. The computer-implemented method of claim 1, wherein based on the observational data determined to include a lack of movement for the user, the processor is configured to initiate an action selected from the group consisting of playing uplifting music and changing lighting in a room.

24. The computer-implemented method of claim 1, wherein in response to receiving a query from the user, the processor is configured to provide a first response as an answer to the query and provide a second response to the query based on analysis of future information stored in the user profile such that the second response extends beyond a request of the query to encompass the future information that is previously stored and scheduled in the user profile.

\* \* \* \* \*